(12) United States Patent
Pearson

(10) Patent No.: US 6,885,862 B1
(45) Date of Patent: Apr. 26, 2005

(54) WIRELESS SUBSCRIBER TERMINAL PROGRAMMING USING A BROADCAST CONTROL CHANNEL

(75) Inventor: Richard J. Pearson, Calgary (CA)

(73) Assignee: Harris Canada, Inc., Alberta (CA)

( * ) Notice: Subject to any disclaimer, the term of this patent is extended or adjusted under 35 U.S.C. 154(b) by 0 days.

(21) Appl. No.: 09/302,825

(22) Filed: Apr. 30, 1999

(51) Int. Cl.[7] .............................................. H04M 3/00
(52) U.S. Cl. ..................... 455/419; 455/418; 455/458; 455/500; 455/503
(58) Field of Search ................................ 455/418, 419, 455/518; 340/7.39, 7.4, 7.41, 7.46

(56) References Cited

U.S. PATENT DOCUMENTS

| | | | |
|---|---|---|---|
| 5,414,751 A | * 5/1995 | Yamada | 455/418 |
| 5,699,275 A | 12/1997 | Beasley et al. | |
| 5,761,618 A | 6/1998 | Lynch et al. | |
| 5,794,141 A | * 8/1998 | Zicker | 455/418 |
| 5,887,254 A | * 3/1999 | Halonen | 455/419 |
| 5,943,425 A | * 8/1999 | Mizikovsky | 380/25 |
| 5,995,829 A | * 11/1999 | Broderick | 455/418 |
| 6,023,620 A | * 2/2000 | Hansson | 455/419 |
| 6,029,065 A | * 2/2000 | Shah | 455/414 |
| 6,044,265 A | * 3/2000 | Roach, Jr. | 455/419 |
| 6,167,257 A | * 12/2000 | Lahdemaki | 455/419 |
| 6,456,843 B1 | * 9/2002 | Daly | 455/419 |

FOREIGN PATENT DOCUMENTS

| | | |
|---|---|---|
| EP | 0 905 991 A2 | 3/1999 |
| WO | WO 98/38820 | 3/1998 |
| WO | WO 98/23050 | 5/1998 |

* cited by examiner

Primary Examiner—Temica M. Beamer
(74) Attorney, Agent, or Firm—Cesari and McKenna, LLP; Rita M. Rooney, Esq.

(57) ABSTRACT

The invention is a system for programming wireless subscriber terminals (WST's) using a broadcast channel of a wireless communication system. In accordance with the invention, a control program, for controlling operation of the WST, is updated using a series of messages transmitted from a base station over a broadcast control channel to one or more WST's simultaneously. Each message in the series contains a segment of the control program, and the series of messages is interleaved with other control data on the broadcast control channel in order to avoid interference with other call activities. When a WST identifies a message as containing a control program segment, the WST stores the segment. Once a complete control program has been received, control of the WST can be transferred to the new control program. Receipt of the broadcast transmission is subject to interruption for a variety of reasons, e.g., a WST is powered off, a WST moves outside the range of a base station, other radio signals or noise interfere with the broadcast signal, or a call is received by a WST, which then transfers to a voice channel. Thus the base station arbitrates the re-transmission of missing program segments by polling individual WST's using control channels, and retransmitting missing segments. The system also preferably provides non-volatile storage of a partial program within each WST so that the WST's need not receive an entire program in a single session.

28 Claims, 5 Drawing Sheets

WIRELESS SUBSCRIBER TERMINAL PROGRAMMING USING A BROADCAST CONTROL CHANNEL

FIELD OF INVENTION

The invention relates to wireless systems, and more particularly to the reprogramming of wireless subscriber terminals in a wireless system using a broadcast control channel.

BACKGROUND OF THE INVENTION

A wireless subscriber terminal ("WST"), also known as a "subscriber" or a "mobile unit," is any mobile or fixed station providing a subscriber's point of interface to a wireless system, typically a cellular or wireless local loop system. WST's within the wireless system communicate with a base station, which manages calls across an air interface by subdividing the available spectrum into a number of voice channels and control channels. The voice channels carry voice signals and other data. The control channels carry information needed to manage the voice channels. Broadcast control channels are used to simultaneously transmit information to all of the terminals within range of a base station, as distinguished from other voice/control channels that operate on a point-to-point basis. The present invention relates to a system for programming WST's over a wireless system using a broadcast control channel.

As telephony techniques have advanced, WST's have become increasingly sophisticated. In addition to radio frequency modulation/demodulation circuitry for transmitting and receiving signals over a wireless channel, WST's typically include signal processing for transforming audio information between analog and digital representations. A microprocessor or microcontroller is also included, both for controlling the voice channel hardware and for providing higher level functions accessible to a WST user. These higher level functions, or "features," include those functions familiar to the typical cellular phone user, such as a call-in-absence indicator, theft alarm, call restrictions, hands-free operation, and handset attributes such as a phone number, security code, and ringer/alert capability.

The microprocessor/microcontroller requires its own software to control initialization of the hardware when the WST is turned on, and to control operation of the WST while it remains on. This software, referred to here as a control program, is stored in a non-volatile memory so that it remains intact until actively erased. Ordinarily, the control program is installed by the WST manufacturer before delivery. The non-volatile memory also typically contains programmable data relating to the identity of the particular WST and the feature settings for the WST. This programmable data is ordinarily entered by a technician prior to delivery to an end user.

The configuration options for WST features can also be programmed remotely. One approach is described in U.S. Pat. No. 5,109,403, in which features are activated over a voice channel using tones. In another approach, control channels are used to update WST features, as described in the recent IS-136 cellular specification. While improving the versatility of wireless systems, these approaches are constrained to setting feature switches, which are then interpreted by the control program to provide features to a WST user. They do not permit replacement of the control program itself.

As control programs and available features change with the passage of time, it is sometimes desirable to update the entire control program associated with a WST, as distinguished from pre-defined features. One method of updating control programs is described in U.S. Pat. No. 5,430,877. This approach uses a physical connection to update software. Another approach to reprogramming may be found in U.S. Pat. No. 5,666,293. This patent describes a system for programming set-top terminals in a broadcast network such as cable television. These systems permit replacement of control programs, but they are constrained to wired, or physical, interconnections. The latter U.S. patent, in particular, does not address the limited bandwidth of wireless networks, or the infirmities of a wireless network's air interface.

There remains a need for a system to program WST's, i.e., suitable to wireless telephony, that permits complete flexibility in WST programming/reprogramming from a remote program database.

SUMMARY OF THE INVENTION

In accordance with the invention, the control program in a wireless subscriber terminal is updated by means of control channel transmissions from a base station. The control program is transmitted as a series of messages containing program segments, interleaved with other messages on a broadcast control channel. When a WST identifies a message as belonging to a control program applicable to the WST, the WST stores the program segment contained in the message.

Reception of the broadcast control channel by a WST can be interrupted by, for example, radio interference, powering down, or movement of a WST beyond the range of a base station. Further, the WST must drop the broadcast control channel and switch to a different physical channel for voice/data traffic. Thus the WST is not always in a condition to receive program messages. To address this problem, the base station arbitrates the transmission of unreceived program segments by polling individual WST's participating in the control program broadcast and retransmitting program segments missed by any of the WST's.

The system preferably provides non-volatile storage of partial programs in each WST so that a WST need not receive an entire program in a single session.

Thus the invention advantageously accomplishes remote WST reprogramming in a manner that avoids use of the voice channels, and in a manner that does not require a continuous, uninterrupted connection to the broadcast control channel.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
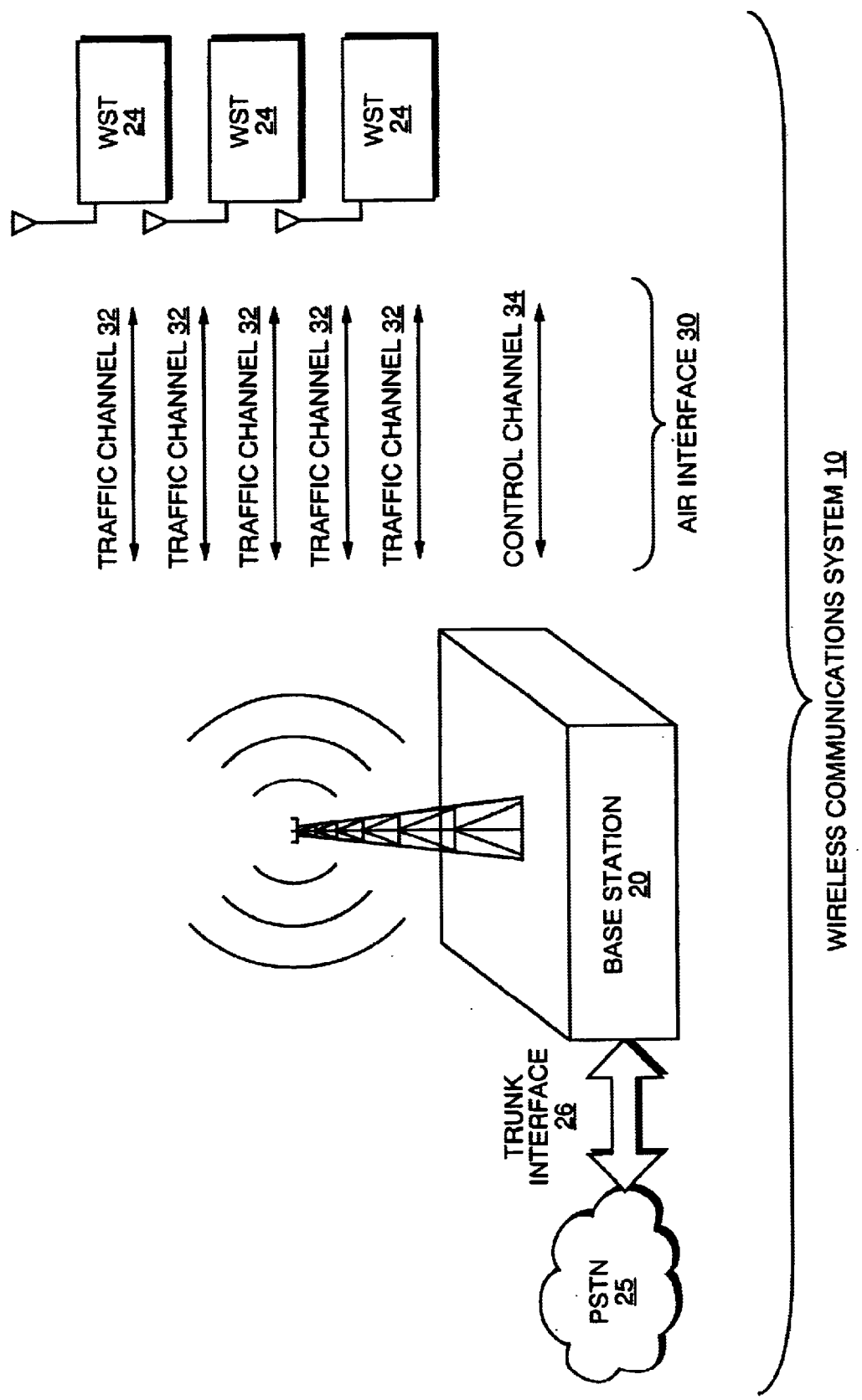
FIG. 1 is a block diagram of a wireless communication system.

FIG. 1 depicts a wireless communication system 10 according to the present invention, in which a base station 20 is in two-way wireless communication with wireless subscriber terminals (WST's) 24, and in further two-way communication with a landline system 25 via a trunk 26. The landline system 25 may be the public switched telephone network (PSTN), or any other wired network capable of voice/data connections. If an active call is present on the trunk 26, the base station 20 translates the forward trunk signal to a properly formatted radio signal which is radiated by an antenna 27 to a WST 24 over the air interface 30. The WST 24 performs complementary operations to establish two-way voice connections over the air interface 30.

The term "trunk," as used herein, refers to a conventional connection to a PSTN for carrying a plurality of telephone signals, and is further intended to include a plurality of such trunks, an individual subscriber line, or any other connection to a landline system 25.

The terms such as "voice channel" and "voice traffic", as used herein, are intended to include the communication of conventional audio signals, as well as data, such as facsimile or computer data, that might be carried by a telephone system 25.

It should further be appreciated that numerous wireless communications systems are known and used worldwide, and the present invention may be usefully practiced with any of these, or other proprietary or private systems, provided the system includes an air interface 30 having at least one control channel, distinct from the voice channels, which can provide broadcast communication to numerous WST's 24, along with bi-directional control communication between individual WST's 24 and the base station 20. While the invention is intended to be used primarily with a wireless local loop installed as an alternative to a landline, it will be appreciated by those skilled in the art that the wireless communication system 10 may also be a cellular or macro/micro-cellular system designed for mobile telephony and that certain adaptations may be made for such cellular applications.

It is particularly contemplated that the invention will be used with more sophisticated, emerging standards such as GSM, PCS, and third generation standards derived from the IMT-2000 program. The following embodiment of the invention uses the digital sector of the air interface 30 described by the Telecommunications Industry Association's IS-136 specification (IS-136). Briefly stated, the digital sector of IS-136 is a digital, time division multiple access (IDMA) technology operating on 800 MHz and 1900 MHz.

As shown in FIG. 1, the IS-136 air interface 30 includes digital traffic channels 32 which are two-way links for voice traffic. The air interface 30 also includes a digital control channel (DCCH) 34 having (logical) broadcast control channels for broadcasting information from the base station 20 to numerous WST's. The DCCH 34 also includes several (logical) point-to-point control channels for direct, two-way control communication between each WST 24 and the base station 20. This combination of control channels can be advantageously employed to effectively transmit an entire control program to several participating WST's 24 while conserving the typically limited digital traffic channels 32 for voice traffic between the landline system 25 and the WST's 24.

Figure 2:
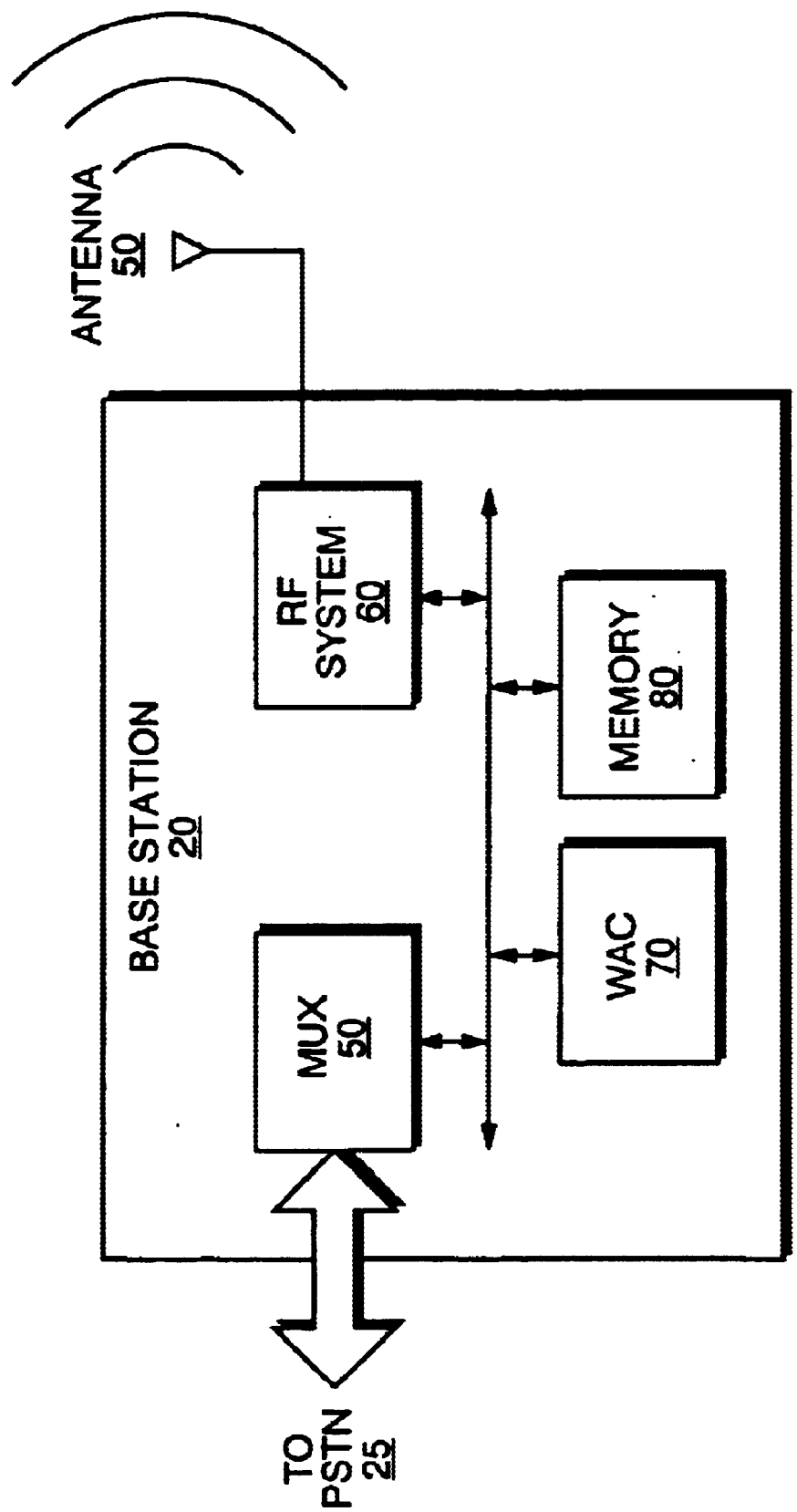
FIG. 2 is a block diagram of a base station.

As shown in FIG. 2, the base station 20 provides an interface between the landline system 25 and the WST's 24. In order to function in this capacity, the base station 20 includes a MUX/switch 50 on one hand to transmit and receive wired network voice traffic, and a radio frequency (RF) system 60 connected to the antenna 27 on the other hand to transmit and receive wireless voice traffic across the air interface 30. A wireless access controller (WAC) 70 manages the operations of the RF system 60 and the MUX/switch 50 to ensure that each wired voice connection is coupled to the correct channel of the air interface 30. The WAC 70 also performs functions related to voice encoding, compression, encryption, and security.

With respect to the present invention, the WAC 70 performs several specific functions. First the WAC 70 manages the transmission of a control program over the broadcast control channel. The control program is stored in a memory 80 in the base station 20. In order to transmit the control program to the WST's 24, the WAC 70 divides the control program into program segments which can be interleaved with other broadcast control channel transmissions, i.e., transmitted between other control messages so as to avoid interfering with ordinary operations of the wireless system 10. When it is desired to update the control program for the WST's that is stored in the memory 80 of the base station 20, for example, over the landline system 25, the wireless access controller 70 also manages the receipt of the control program over a trunk 26 and storage of the control program in the memory 80.

Figure 3:
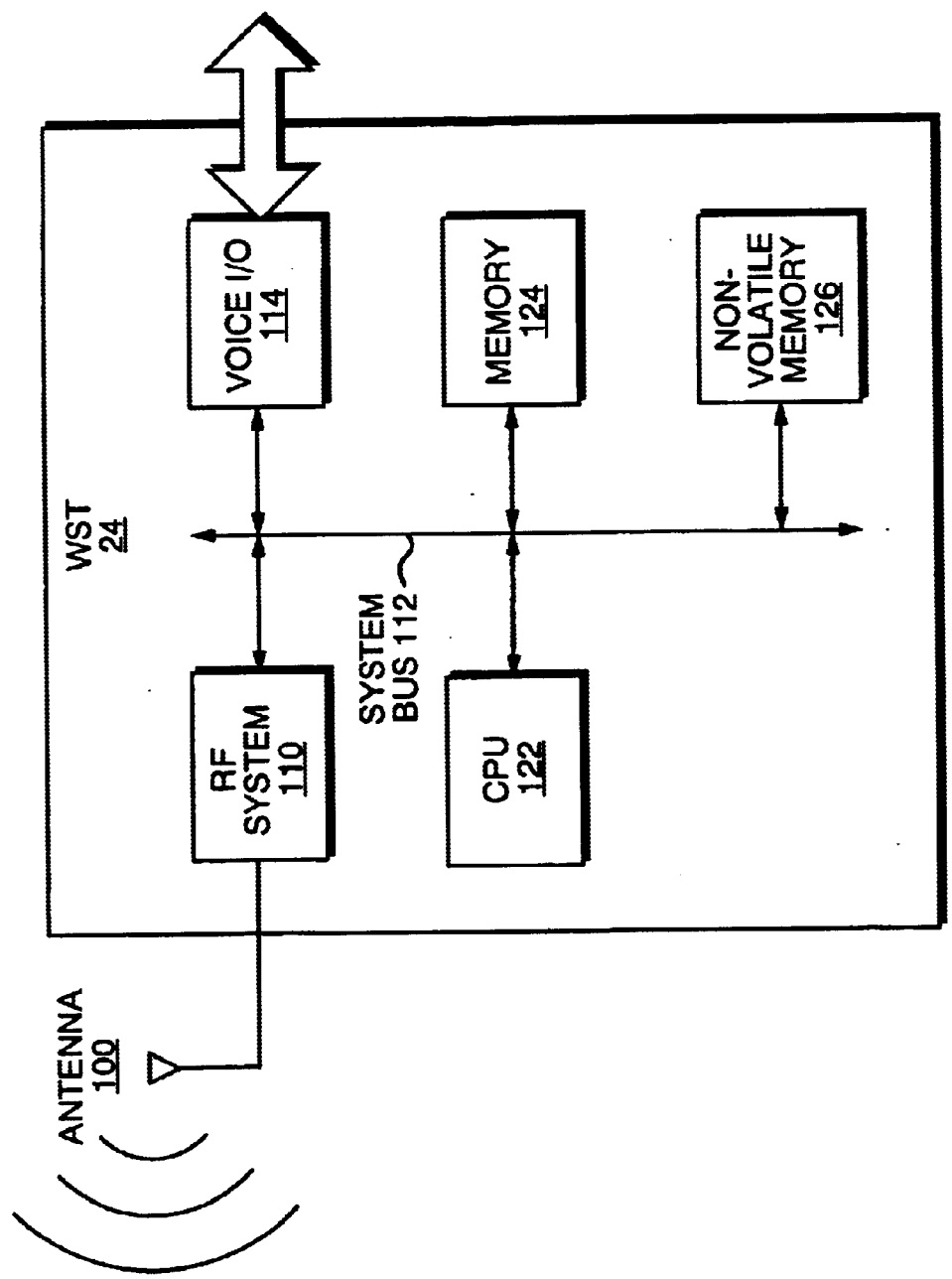
FIG. 3 is a block diagram of a wireless subscriber terminal.

As shown in FIG. 3, a WST 24 transmits and receives signals through the air interface 30 using an antenna 100 coupled to an RF system 110. The demodulated voice signal, or some encoded representation thereof, is carried on a system bus 112 to a voice signal port 114. In the preferred wireless local loop embodiment, the voice signal port 114 is a modular jack compatible with standard local loop telephone cords, along with any appropriate conversion circuitry. The WST 24 also includes a processor 122 connected to the system bus 112 for controlling operation of the WST 24, as well as a memory 124 for temporary storage and a non-volatile memory 126 for storage of a WST control program.

The control program consists of a series of instructions which the processor 122 can execute to control operation of the WST 24. The term "firmware", as used in the following discussion, is intended to refer to an executable firmware image for use with a microcontroller, as well as any other executable code, instructions, or other software that might be used as a control program for a WST 24. Reprogramming the WST 24 with a new control program comprises four general steps: (1) initialization, (2) program broadcast, (3) verification, and (4) switch-over. These steps are now described in detail.

Figure 4:
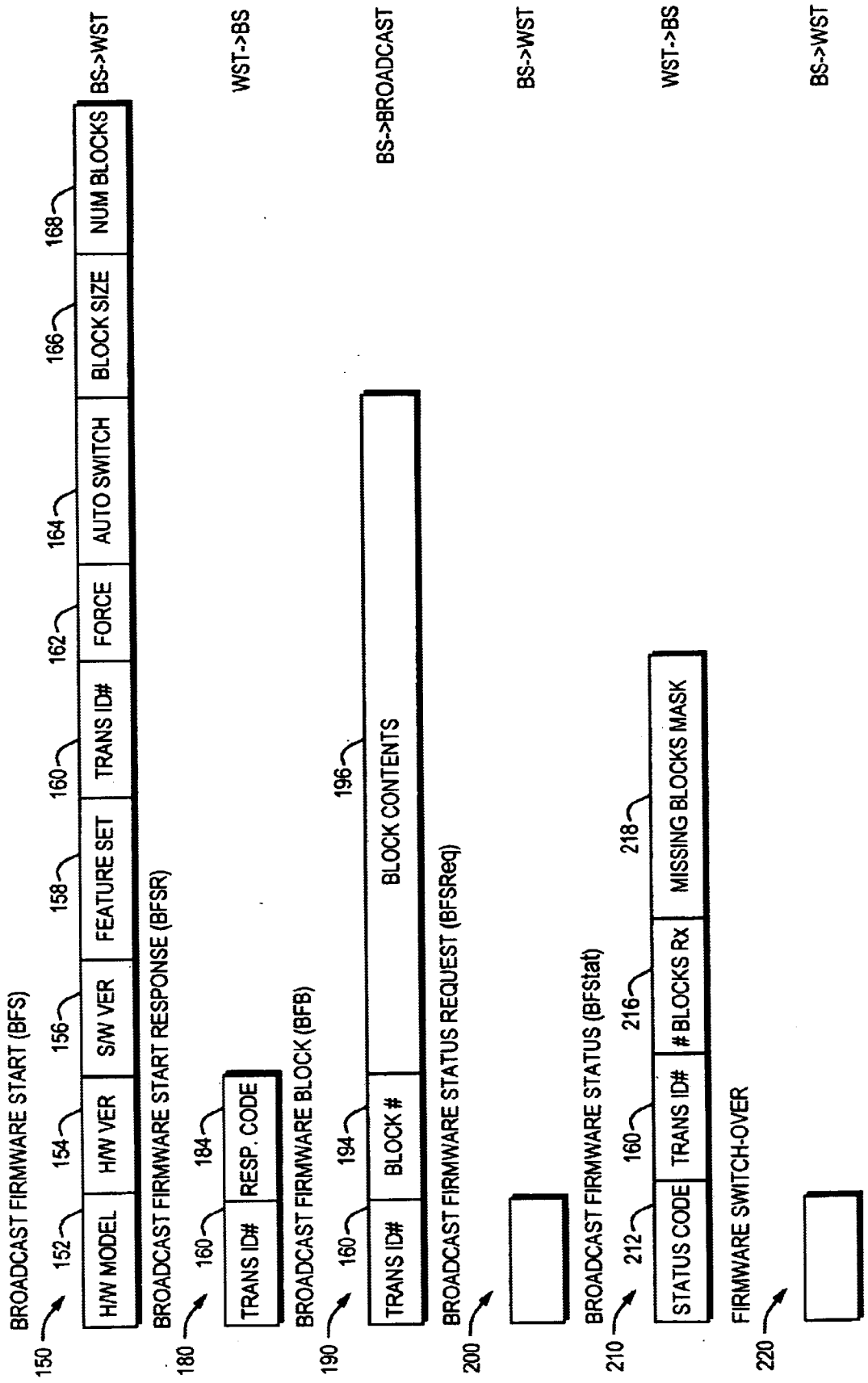
FIG. 4 is a diagram of the message formats used in the invention.

1. Initialization:

Before broadcast transmission of a new control program, the base station 20 directly initializes each WST 24 by sending each WST 24 a broadcast firmware start (BFS) message 150 over a forward point-to-point control channel. FIG. 4 shows the format of the BFS message 150, which is used by each WST 24 to determine whether it should participate in the upcoming control program broadcast. The BFS message 150 includes a hardware model number 152, a hardware version number 154, a firmware version number 156 for the particular control program, and a feature set identifier 158. Each WST 24 compares this information with stored information to determine whether it should receive the impending control program broadcast.

The BFS message 150 also includes information which participating WST's 24 use to handle the subsequent broadcast messages containing the new control program. A transfer identifier 160 uniquely identifies the control program broadcast. The same identification number is also included in all of the broadcast messages containing the new control program so that each WST 24 can recognize them. A force transfer flag 162 can direct the recipient WST 24 to load the new control program even when the WST 24 already has a matching firmware version number 156. An automatic switch-over flag 164 can be used to instruct the WST 24 to automatically transfer control to the new control program once a complete program has been received. If the automatic switch-over flag 164 is not set, then the WST 24 waits for a command from the base station 20 to switch to the new control program.

Further flexibility is provided by including, in the BFS message 150, a block size field 166 and a number-of-blocks field 168. By transmitting these parameters, the base station can adjust message lengths for a particular control program broadcast.

Each WST 24 receiving the BFS message 150 replies with its own BFS response (BFSR) message 180. This is a simple two-part message transmitted over a reverse control channel. The BFSR message 180 includes the transfer identifier 160 from the BFS message 150, and a response code 184 which indicates whether the WST 24 will participate in the pending control program transfer.

The base station 20 receives a BFSR message 180 from each WST 24. This information is stored in the memory 80 of the base station 20 for use during the reprogramming. At this point, initialization is complete and the base station 20 may initiate a control program broadcast.

2. Control Program Broadcast:

The base station 20 transmits segments of the new control program using broadcast firmware block (BFB) messages 190 transmitted over a broadcast channel. Each BFB message 190 has three parts. The transfer identifier 160 is again used to uniquely identify the control program broadcast. A block number 194 is included to allow for proper sequencing of control program blocks. And, of course, the firmware block 196 itself is included in the BFB message 190. The length of the firmware block 196 is specified in the (previously transmitted) BFS message 150. The BFB messages 190 are interleaved with other broadcast channel transmissions within a logical channel so as to permit other broadcast channel traffic required for normal operation of the wireless communication system 10.

The base station 20 continues broadcasting BFB messages 190 until it has transmitted a complete control program. If the broadcast channel was an error free, uninterrupted communication medium, this would conclude the firmware transfer. However, there is no guarantee that every BFB message 190 reaches every participating WST 24. Any number of events may cause a WST 24 to miss BFB messages 190, including a user powering off the WST 24, interference in the air interface, equipment failure, or the WST 24 switching to a digital traffic channel 32 for normal call activities. Thus the wireless system proceeds to verify the control program broadcast.

3. Verification:

In order to verify the firmware broadcast, the base station 20 polls all of the participating WST's 24 using broadcast firmware status request (BFSReq) messages 200, transmitted over one or more forward point-to-point control channels. Each BFSReq message 200 includes no message other than its own request for status information.

Each WST 24 responds to the BFSReq message 200 using a broadcast firmware status (BFStat) message 210, transmitted to the base station 20 over a reverse control channel. The BFStat message 210 includes a status code 212 indicating the status of the received control program, e.g., transfer incomplete, transfer complete, transfer and switch-over complete. The status code 212 may also contain information available from WST 24 self-tests, such as a hardware failure or unsuccessful switch-over while attempting to use the new control program. These self-tests are described below in reference to the switch-over to a new control program, but they may be conducted before or after the WST 24 receives a BFSReq message 200.

As with the other messages, the BFStat message 210 includes the transfer identifier 160. Using a blocks received field 216 in the BFStat message 210, the WST 24 also informs the base station 20 of the number of blocks successfully received. Finally, the BFStat message 210 includes a missing block mask 218 for identifying those blocks which have not been received.

The missing block mask 218 is a multi-bit mask in which each bit represents a series of control program blocks. In a preferred embodiment, the mask is 64 bits long and each bit is mapped to a sequential, integer number of blocks representing approximately one sixty-fourth of the entire block range. By coding and decoding the missing blocks in this manner with a predetermined formula, each WST 24 can quickly and efficiently inform the base station 20 of block ranges in which there are blocks missing.

At this point, the base station 20 retransmits any missing control program blocks. The collective BFStat messages 210 received by the base station 20 provide a complete picture of which blocks are missing from which WST's 24 within the wireless system 10. In order to fill these gaps, the base station 20 may employ a number of strategies. The base station 20 may simply re-broadcast a complete set of missing blocks, or the base station 20 may individually transmit blocks to each WST 24 using forward point-to-point control channels. Where a single WST 24 has missed a significant number of blocks, it may even be desirable to transmit a set of missing blocks using a (higher data rate) digital traffic channel. Alternatively, the base station 20 may analyze the distribution and symmetry of missing blocks to select some mix of these two strategies which optimizes air interface traffic and/or speed. Any methodology can be employed, provided each participating WST 24 has a complete control program prior to switch-over.

4. Switch-Over:

The final message type of the reprogramming protocol is a firmware switch-over message 220, transmitted from the base station 20 to a WST 24 using a forward point-to-point channel. Upon receipt of the firmware switch-over message 220, the WST 24 stores the complete new control program in non-volatile memory 126 and transfers control to the new control program. Optionally, the switch-over may be automatic, as when the automatic switch-over flag 164 is set in the initial BFS message 150.

The old control program is retained after the switch-over. When the WST 24 first transfers control to the new control program, a series of internal verification tests are performed to ensure that the new control program is operating correctly. This includes conventional power-on self tests of memory 124 and system bus 112 input/outputs. Each item of hardware used by the control program, e.g., the RF unit 110, is also tested to ensure that it is present and responding to the processor 122. If the power-on tests are successfully completed, the WST 24 then attempts to access the broadcast control channel used by the base station 20, using the new control program. If any of these tests are failed, the new control program is rejected and the WST 24 restores the old control program. If all of these tests are successfully completed, the new control program is marked as "accepted" (so that subsequent WST power-on's do not result in an inappropriate rejection of the new control program), and control of the WST 24 is unconditionally transferred to the new control program.

Figure 5:
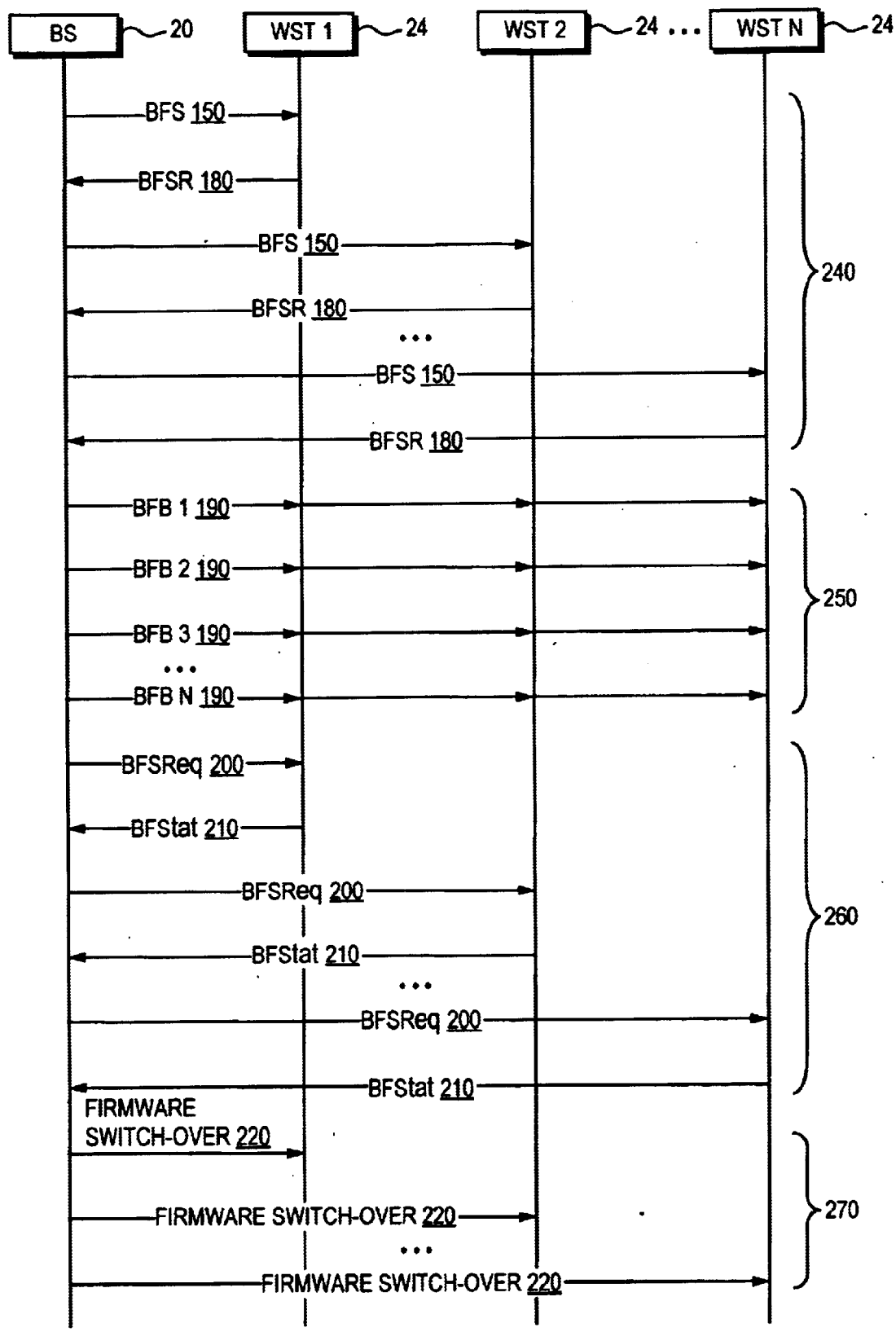
FIG. 5 is a data flow chart showing the flow of data between a base station and wireless subscriber terminals according to the invention.

FIG. 5 shows the flow of data according to the programming method described above. The base station 20 and each WST 24 are shown as vertical lines. The horizontal lines indicate data flow between the base station 20 and each WST 24, with arrows indicating the direction of data flow. The initialization 240 comprises a BFS message 150 transmitted from the base station 20 to each WST 24 on a point-to-point basis. Once each participating WST 24 has responded with a BFSR message 180, the base station performs a control program broadcast 250 by broadcasting the BFB messages 190 containing control program blocks. It will be noted that each BFB message 190 is a single broadcast transmission to all of the participating WST's 24. After all of the BFB messages 190 have been transmitted, The base station 20 performs a verification 260 of the broadcast. This comprises BFSReq messages 200 from the base station 20 to each WST 24 on a point-to-point channel, and a responsive BFStat message 210 from each WST 24 to the base station 20. Where firmware switch-over is controlled from the base station 20, a final switch-over step 270 is performed by a Firmware Switch-Over message 220 from the base station 20 to each participating WST 24.

A number of variations to this reprogramming system are possible once the basic update system is in place. Each WST 24 may store multiple control programs for use at different times, with the base station 20 controlling each switch-over as needed. Further, the reprogramming system may be used to provide software patches, that is, individual blocks of a control program may be replaced without replacing the entire image.

Although the present invention has been shown and described with respect to a preferred embodiment thereof, it should be understood by those skilled in the art that various other changes, omissions and additions to the form and detail thereof may be made therein without departing from the spirit and scope of the invention.

What is claimed is:

1. A method for programming wireless subscriber terminals in a wireless system, the wireless system having a base station in wireless communication with the wireless subscriber terminals using one or more control channels and multiple traffic channels, and each wireless subscriber terminal having a memory, a non-volatile memory, a processor to control operation of the wireless subscriber terminal, the method comprising the steps of:

A. transmitting from the base station over a point-to-point channel to wireless subscriber terminals information about a new control program including in said information, a number of blocks and a block-size for a firmware image representing said new control program;

B. transmitting a response from each individual wireless subscriber terminal over a point-to-point channel to the base station indicating whether that terminal will be a recipient of the new control program;

C. broadcasting the new control program in a series of identified blocks of data from the base station to the recipient terminals over a control channel for each block in the firmware image;

D. polling all of the recipient terminals by the base station over a point-to-point channel to determine the transfer status of all blocks of the new control program at each recipient terminal;

E. transmitting a status message from each recipient terminal to the base station indicating the status of the reception of the new control program including information about how many blocks were received of said firmware image and/or a range of blocks missing;

F. re-transmitting select missing data blocks to each recipient terminal in response to the individual status messages sent from each recipient terminal that indicate an incomplete transmission and the specific data blocks needed; and G. transferring control of each recipient terminal to said new control program.

2. The method of claim 1, wherein the step of re-transmitting occurs over one or more point-to-point control channels.

3. The method of claim 1, wherein the step of re-transmitting occurs over one or more broadcast control channels.

4. The method of claim 1, wherein the step of transferring control involves performing a series of diagnostic tests at each recipient wireless subscriber terminal to determine the validity of the new control program received at that wireless subscriber terminal.

5. The method of claim 1, further comprising the step of storing each program segment received in a block of data by the recipient wireless subscriber terminal in the non-volatile memory of the wireless subscriber terminal, whereby the wireless subscriber terminal retains all received program segments if reception of program segments by the wireless subscriber terminal is interrupted.

6. The method of claim 1 further comprising the step of storing a pre-existing control program in non-volatile memory after transferring control of the processor to the new control program.

7. The method of claim 1 wherein the pre-existing control program and the new control program each comprise a software patch for controlling less than all of the operations of the wireless subscriber terminal.

8. The method of claim 1 wherein the wireless subscriber terminal is a cellular phone.

9. The method of claim 1 wherein the wireless subscriber terminal is a terminal of a wireless local loop.

10. The method of claim 1 wherein the step of transferring control to the new control program is forced by the base station during the step of initializing each wireless subscriber terminal.

11. A system for programming wireless subscriber terminals, the system comprising:

a base station, the base station having a memory;

a control program stored in the memory of the base station;

one or more wireless subscriber terminals in wireless communication with the base station over an air interface, the air interface comprising a plurality of traffic channels and a plurality of control channels;

means for transmitting from the base station over a point-to-point channel to wireless subscriber terminals information about a new control program including in said information, a number of blocks and a block-size for a firmware image representing the new control program;

means for transmitting a response from each individual wireless subscriber terminal over a point-to-point channel to the base station indicating whether that terminal will be a recipient of the new control program;

means for broadcasting the new control program in a series of identified blocks of data from the base station to the recipient terminals over a control channel for each block in the firmware image;

means for polling all of the recipient terminals by the base station over a point-to-point channel to determine the transfer status of all blocks of the new control program at each recipient terminal;

means for transmitting a status message from each recipient terminal to the base station over a control channel indicating the status of the reception of the new control program including information about how many blocks were received and/or a range of blocks missing;

means for re-transmitting select missing data blocks to each recipient terminal in response to the individual status messages sent from each recipient terminal indicating an incomplete transmission and the specific data blocks needed; and means for transferring control of each recipient terminal to said new control program.

12. The system of claim 11, wherein the one or more wireless subscriber terminals comprise cellular phone handsets.

13. The system of claim 11, wherein the one or more wireless subscriber terminals comprise wireless local loop terminals.

14. A base station for programming one or more wireless subscriber terminals in a wireless system, the base station comprising:

a memory;

a control program stored in the memory as one or more program segments;

a transmitter for transmitting point-to-point forward messages to wireless subscriber terminals including information about a new control program over an air interface, and broadcast forward messages to recipient terminals including a series of identified broadcast firmware block messages including individual blocks of a firmware image which together form a new control program, and forward messages including polling inquiries to recipient terminals over a control channel about the transfer of a new control program to recipient terminals and including the one or more program segments stored in the memory that can be selectively transmitted without regard to sequence;

a receiver for receiving reverse messages from wireless subscriber terminals over the air interface, including one or more status messages from recipient terminals over a point-to-point control channel including a response from each individual terminal to said base station indicating whether the terminal will be a recipient of the new control program, and messages indicating the status of the reception of all blocks of said firmware image representing said a new control program, or portion thereof; and a processor connected to the memory, the transmitter, and the receiver for controlling operation of the base station.

15. The base station of claim 14, the forward messages including broadcast firmware start messages and the reverse messages including broadcast firmware start response messages.

16. The base station of claim 14, the forward messages including broadcast firmware status request messages and the reverse messages including broadcast firmware status messages.

17. The base station of claim 14, the forward messages including firmware switch-over messages.

18. A method for operating a base station to program one or more wireless subscriber terminals in a wireless system, the method comprising the steps of:

A. transmitting from the base station to wireless subscriber terminals information about a new control program, including in said information, a number of blocks and a block-size for a firmware image representing the new control program;

B. receiving a response from each individual wireless subscriber terminal over a point-to-point channel to the base station indicating whether that terminal will be a recipient of the new control program;

C. broadcasting the new control program in a series of identified blocks of data from the base station to the recipient terminals over a control channel for each block in the firmware image;

D. polling all of the recipient terminals over a point-to-point channel to determine the transfer status of all blocks of the new control program at each recipient terminal;

E. receiving a status message from each recipient terminal to the base station over a point-to-point channel indicating the status of the reception of the new control program, including information about how many blocks were received and/or a range of blocks missing;

F. re-transmitting select missing data blocks to each recipient terminal in response to the individual status messages sent from each recipient terminal that indicates an incomplete transmission and the specific data blocks needed; and G. transferring control of each said recipient terminal to said new control program.

19. The method of claim 18, the step of broadcasting further comprising the step of transmitting one or more broadcast firmware block messages over a broadcast channel.

20. A wireless subscriber terminal for use in a wireless system, the terminal comprising:

a memory, a transmitter for transmitting reverse messages from the terminal over an air interface including one or more status messages over a point-to-point channel including transmitting a response to a base station indicating whether the terminal will be a recipient of a new control program and messages indicating the status of reception of a new control program, or portion thereof including information relating to missing data blocks from a program transfer;

a receiver for receiving forward messages from a base station over a channel including point-to-point messages or broadcast messages of a firmware image includes a series of identified blocks of data that comprise the new control program, the forward messages including polling inquiries about the transfer of a new control program to the terminal and including messages concerning the one or more program segments irrespective of their sequence; and a processor connected to the memory, the transmitter, and the receiver for controlling the terminal, and for storing the one or more program segments in the memory.

21. The terminal of claim 20 wherein the forward messages include broadcast firmware start messages and the reverse messages include broadcast firmware start response messages.

22. The terminal of claim 20 wherein the forward messages include broadcast firmware status request messages and the reverse messages include broadcast firmware status messages.

23. The terminal of claim 20 wherein the forward messages include firmware switch-over messages.

24. The terminal of claim 20 wherein the forward messages including the one or more program segments are broadcast messages.

25. A method for operating a wireless subscriber terminal in a wireless system to receive a control program, the method comprising the steps of:
- A. receiving from the base station information about a new control program, including in said information, a number of blocks and a block size for a firmware image representing the new control program;
- B. transmitting a response from each individual wireless subscriber terminal over a point-to-point channel to the base station indicating whether that terminal will be a recipient of the new control program;
- C. receiving the new control program in a series of identified blocks of data through a broadcast from the base station at the recipient terminals;
- D. receiving a status request at all of the recipient terminals over a channel to determine the transfer status of the new control program at each recipient terminal, including information about how many blocks were received and/or a range of blocks missing;
- E. transmitting a status message from each recipient terminal to the base station over a control channel that indicates the status of the reception of the new control program and specific data blocks missing;
- F. re-receiving select missing data blocks at each recipient terminal from the base station in response to the individual status messages sent from each recipient terminal; and
- G. transferring control of each recipient terminal to said new control program.

26. The method of claim 25, the step of receiving the new control program further comprising the step of receiving a plurality of firmware block messages over a broadcast channel.

27. The method of claim 25, the step of transferring control further comprising the step of receiving a firmware switch-over message.

28. The method of claim 1 including transmitting from said base station said information about said new control program that includes at least one of the following:
- a hardware model;
- a mask number;
- a software version number;
- an ID number which uniquely identifies the transfer, and
- a force-transfer notification.

* * * * *